(12) United States Patent
Ishihara et al.

(10) Patent No.: US 11,436,751 B2
(45) Date of Patent: Sep. 6, 2022

(54) ATTENTION TARGET ESTIMATING DEVICE, AND ATTENTION TARGET ESTIMATING METHOD

(71) Applicant: NIPPON TELEGRAPH AND TELEPHONE CORPORATION, Tokyo (JP)

(72) Inventors: Hiroyuki Ishihara, Musashino (JP); Takayuki Nakachi, Musashino (JP); Takahiro Yamaguchi, Musashino (JP); Masanori Ogawara, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/266,948

(22) PCT Filed: Aug. 9, 2019

(86) PCT No.: PCT/JP2019/031626
§ 371 (c)(1),
(2) Date: Feb. 8, 2021

(87) PCT Pub. No.: WO2020/032254
PCT Pub. Date: Feb. 13, 2020

(65) Prior Publication Data
US 2021/0304434 A1 Sep. 30, 2021

(30) Foreign Application Priority Data
Aug. 10, 2018 (JP) .............................. JP2018-151148

(51) Int. Cl.
*G06T 7/70* (2017.01)

(52) U.S. Cl.
CPC ...... *G06T 7/70* (2017.01); *G06T 2207/10016* (2013.01)

(58) Field of Classification Search
None
See application file for complete search history.

(56) References Cited

U.S. PATENT DOCUMENTS 10,027,888 B1* 7/2018 Mackraz .............. G06V 20/47
2017/0352190 A1* 12/2017 Calloway .............. G06T 19/006

FOREIGN PATENT DOCUMENTS

| JP | 2006155238 A | * | 6/2006 |
| JP | 2013179403 A | | 9/2013 |
| JP | 201741019 A | | 2/2017 |

OTHER PUBLICATIONS

Hyun Soo Park et al., 3D Social Saliency from Head-mounted Cameras, NIPS, 2012.

(Continued)

*Primary Examiner* — Delomia L Gilliard (57) ABSTRACT

An objective of the present disclosure is to enable estimation of an attention target of communication parties even if there are a plurality of objects having the same appearance in a space. An attention target estimation device 10 according to the present disclosure acquires a first-person point-of-view video $IM_i$ captured from a perspective of a person and a line-of-sight position $g_i$ of a person when the first-person point-of-view video $IM_i$ is captured, identifies positions in a 3D space of objects 31, 32, and 33 extracted from the first-person point-of-view video $IM_i$, and determines an object close to the line-of-sight position $g_i$ of the person among the objects 31, 32, and 33 included in the first-person point-of-view video $IM_i$ as the attention target of the person.

10 Claims, 4 Drawing Sheets

(56) References Cited

OTHER PUBLICATIONS

Yifei Huang et al., Temporal Localization and Spatial Segmentation of Joint Attention in Multiple First—Person Videos, ICCV Workshop, 2017.
Pierre Moulon et al., Global Fusion of Relative Motions for Robust, Accurate and Scalable Structure from Motion, ICCV, 2013.
Vincent Lepetit et al., EPnP: An accurate O(n) solution to the PnP problem, IJCV, 2009.
Joseph Redmon and All Farhadi, YOLO9000: Better, Faster, Stronger, CVPR, 2017.
Hiroyuki Ishihara et al., Basic study on overt attention target and joint attention estimation method using first-person viewpoint video group for communication support, IEICE Technical Report, May 21, 2018, pp. 7-10.

\* cited by examiner

ATTENTION TARGET ESTIMATING DEVICE, AND ATTENTION TARGET ESTIMATING METHOD

CROSS-REFERENCE TO RELATED APPLICATIONS

This application is a 371 U.S. National Phase of International Application No. PCT/JP2019/031626 filed on Aug. 9, 2019, which claims priority to Japanese Application No. 2018-151148 filed on Aug. 10, 2018. The entire disclosures of the above applications are incorporated herein by reference.

TECHNICAL FIELD

The present disclosure relates to a technique for facilitating communication using a computer system, and more particularly, to an attention target estimation technique for identifying an "attention" target of a person communicating in a certain space.

BACKGROUND ART

Enhancing expression and comprehension for humans and facilitating their communication require a technique for externally observing a state of communication and understanding the state. Understanding and adequately supporting the communication state require not only understanding the action of a user, but also considering an internal state of the user behind the action and the relationship with the state of a communication space.

When humans try to receive information from outside world, they attempt to receive information only from an appropriate target and suppress information from the other targets. Such an attempt is made by a cognitive mechanism called "attention". This can be rephrased as a process for humans to extract information that is considered to be important at a certain time. In addition, a state in which a plurality of persons are paying attention to a common target is called "joint attention".

When a computer system is considered to support communication, detection of the targets to which communication parties are paying attention and the presence or absence of joint attention may lead to development of a more intelligent communication support system such as a method for estimating the degree of communication comprehension and guiding attention to others.

As prior art for estimating the presence or absence of joint attention, there have been disclosed a method (for example, see Non-Patent Literature 1) for estimating the joint attention from the "place" to which the communication parties are paying attention or a method (for example, see Non-Patent Literature 2) for estimating the joint attention from whether or not the attention target is the "object" having the same appearance (external view). However, for example, if there are a plurality of objects having the same appearance in a space, the above prior art cannot determine which object is the attention target of the communication parties, and thus cannot determine whether or not joint attention has occurred.

CITATION LIST

Non-Patent Literature

Non-Patent Literature 1: H. Park, E. Jain, and Y. Sheikh, "3D Social Saliency from Head-mounted Cameras" NIPS, 2012.

Non-Patent Literature 2: Y. Huang, M. Cai, H. Kera, R. Yonetani, K. Higuchi and Y. Sato, "Temporal Localization and Spatial Segmentation of Joint Attention in Multiple First-Person Videos", ICCV Workshop, 2017.

Non-Patent Literature 3: P. Moulon, P. Monasse, R. Marlet, "Global Fusion of Relative Motions for Robust, Accurate and Scalable Structure from Motion", ICCV, 2013.

Non-Patent Literature 4: V. Lepetit, F. Moreno-Noguer, and P. Fua, "EPnP: An accurate O(n) solution to the PnP problem", IJCV, 2009.

Non-Patent Literature 5: J. Redmon and A. Farhadi, "YOLO9000: Better, Faster, Stronger", CVPR, 2017.

SUMMARY OF THE INVENTION

Technical Problem

An objective of the present disclosure is to enable estimation of an attention target of communication parties even if there are a plurality of objects having the same appearance in a space.

Means for Solving the Problem

In order to achieve the above objective, the present disclosure uses a first-person point-of-view video of a person i (a 2D image captured from a perspective of the person i) in a space and line-of-sight information of the person (information on a position to which the person i is directing his or her line of sight), thereby to: (1) detect an object included in the first-person point-of-view video and map each of a plurality of extracted objects in a 3D space; (2) calculate a distance between the person i's line-of-sight position and the object position for each of the plurality of extracted objects, and extract the object with the smallest distance as an attention target of the person i.

Specifically, an attention target estimation device according to the present disclosure acquires a first-person point-of-view video captured from a perspective of a person and information of a line of sight of the person when the first-person point-of-view video is captured, identifies a position of an object extracted from the first-person point-of-view video in a three-dimensional (3D) space, and determines an object close to the line of sight of the person among objects included in the first-person point-of-view video as an attention target of the person.

Specifically, an attention target estimation method according to the present disclosure is performed by the attention target estimation device and includes acquiring a first-person point-of-view video captured from a perspective of a person and information of a line of sight of the person when the first-person point-of-view video is captured, identifying a position of an object extracted from the first-person point-of-view video in a 3D space, and determining an object close to the line of sight of the person among objects included in the first-person point-of-view video as an attention target of the person.

The present disclosure includes: an attention target estimation program for causing a computer to function as each functional unit included in the attention target estimation device according to the present disclosure and an attention target estimation program for causing a computer to perform each step included in the attention target estimation method according to the present disclosure. The attention target estimation program according to the present disclosure may be stored in a computer-readable recording medium.

Effects of the Invention

According to the present disclosure, the attention target of the communication parties can be estimated even if there are a plurality of objects having the same appearance in a space.

DESCRIPTION OF EMBODIMENTS

Hereinafter, embodiments of the present disclosure will be described in detail with reference to the drawings. It should be noted that the present disclosure is not limited to the following embodiments. These embodiments are illustrative only, and the present disclosure can be implemented in various modified and improved forms based on the knowledge of those skilled in the art. Note also that in the present specification and the drawings, the components having the same reference numerals or characters denote the same components.

The embodiments according to the present disclosure disclose an attention target estimation system, an attention target estimation device, and an attention target estimation method, which can identify "what (object)" in "where (position)" of the attention target of each person based on a first-person point-of-view video and line-of-sight information of the persons communicating in a certain space. The attention target estimation system, the attention target estimation device, and the attention target estimation method can estimate the attention target of the communication parties even if there are a plurality of objects having the same appearance in the space. Further, the attention target estimation system, the attention target estimation device, and the attention target estimation method can also determine whether or not joint attention has occurred by considering the degree of relevance of the attention target of each person.

The "attention" is divided into two types: an "explicit attention" in which the attention direction matches the line-of-sight direction and an "implicit attention" in which the attention direction does not match the line-of-sight direction, but the present disclosure is directed to the explicit attention. Hereinafter, when simply referring to an "attention", the attention should be intended to indicate an "explicit attention" unless otherwise specified.

As used herein, the term "first-person point-of-view video" indicates a 2D video captured from a perspective of a person communicating in a space. When the person wears a wearable camera 20 on his or her head portion, the wearable camera 20 can capture the first-person point-of-view video. In addition, the term "line-of-sight information" means information indicating where the person communicating in the space is looking at. For example, the "line-of-sight information" is coordinates indicating the position at which the person is gazing in the first-person point-of-view video. The "line-of-sight information" may be acquired by any method. For example, an eye camera or an eye marker camera may be used, which can capture an image of the eyeball of the person in cooperation with the wearable camera 20.

Figure 1:
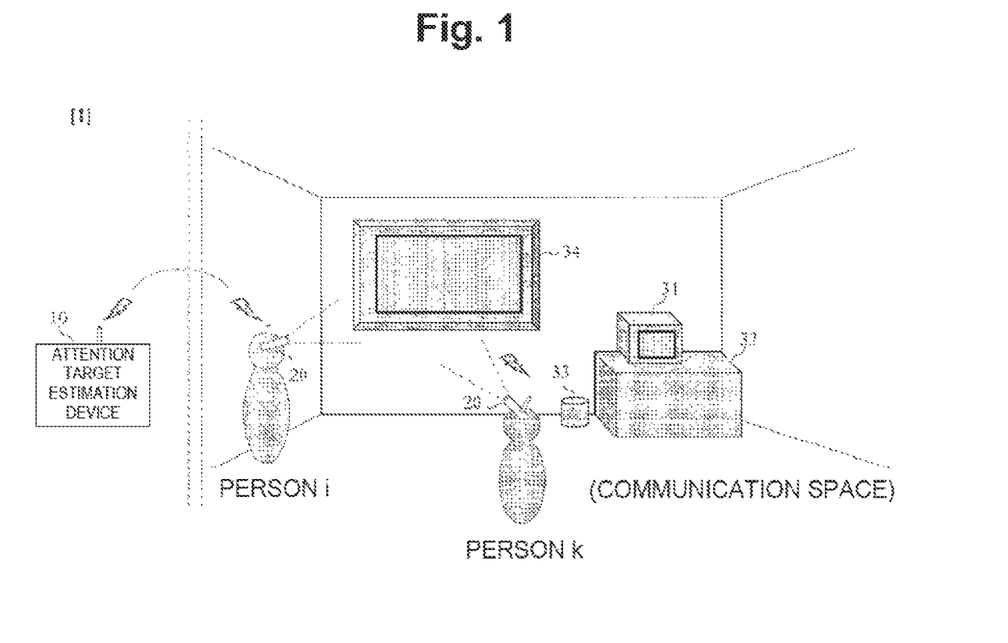
FIG. 1 is a view for describing a configuration example of an attention target estimation system according to the present embodiment.

FIG. 1 is a view for describing a configuration example of an attention target estimation system according to the present embodiment. The communication space includes a plurality of persons (for the sake of drawing, FIG. 1 illustrates only two persons: person i and person k, but the number of persons is not limited to this), each person wearing the wearable camera 20 and an eye camera (unillustrated). Meanwhile, a real space different from the communication space includes an attention target estimation device 10 implementing the attention target estimation method for estimating an attention target.

The attention target estimation device 10 includes 3D information on the communication space stored by a 3D information acquisition process to be described later. The 3D information of the communication space includes identification information of a feature point present in the communication space and 3D coordinates in the communication space. Further, the 3D information of the communication space may include color information on the feature point.

The wearable camera 20 worn by the person i in the communication space captures the first-person point-of-view video of the person i. At the same time, an eye camera (unillustrated) worn by the person i in the communication space captures an image of the eyeball of the person i to acquire the line-of-sight information of the person i. The wearable camera 20 and the eye camera are temporally synchronized and the mutual positional relationship has been calibrated. The wearable camera 20 uses any communication means to transmit the first-person point-of-view video of the person i and the line-of-sight information to the attention target estimation device 10.

The attention target estimation device 10 receives the first-person point-of-view video of the person i and the line-of-sight information from the wearable camera 20. The attention target estimation device 10 uses the preliminarily acquired 3D information of the communication space and the received first-person point-of-view video of the person i and line-of-sight information to execute an attention target estimation process to be described later, and thereby estimates the object of the attention target and the position to which the person i is paying attention in the first-person point-of-view video of the person i.

The attention target estimation device 10 also receives the first-person point-of-view video of the person k and the line-of-sight information, and estimates the object of the attention target of the person k and the position in the first-person point-of-view video of the person k. Then, the attention target estimation device 10 uses information on the estimated object of the attention target of the person i and the estimated object of the attention target of the person k to execute a joint attention determination process to be described later, and thereby determines whether or not joint attention has occurred.

The attention target estimation device 10 illustrated in FIG. 1 has been described as being disposed in the real space different from the communication space, but the present disclosure is not limited to such an embodiment. The attention target estimation device 10 may naturally be disposed in the same real space as the communication space. Further, the attention target estimation device 10 does not need to be configured by only one piece of hardware. For example, each of the person i and the person k holds a portable attention target estimation device 10, and a plurality of attention target estimation devices 10 may cooperate to execute the attention target estimation process or the joint attention determination process. In this case, the portable attention target estimation device 10 held by each person may be incorporated in the wearable camera 20.

Figure 2:
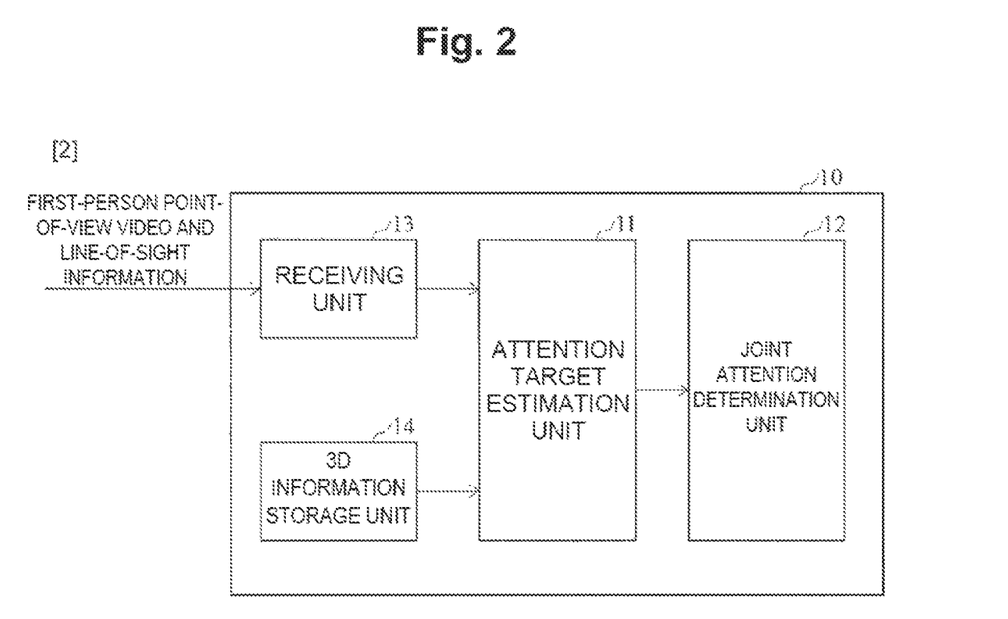
FIG. 2 is a view for describing a configuration example of an attention target estimation device according to the present embodiment.

As illustrated in FIG. 2, the attention target estimation device 10 may be configured to include, for example, a receiving unit 13 that receives the first-person point-of-view video and the line-of-sight information from the wearable camera 20 worn by the person, a 3D information storage unit 14 that stores 3D information acquired by the 3D information acquisition process to be described later, an attention target estimation unit 11 that executes the attention target estimation process to be described later, and a joint attention determination unit 12 that executes the joint attention determination process. The receiving unit 13, the 3D information storage unit 14, the attention target estimation unit 11, and the joint attention determination unit 12 may be integrated into, for example, one application specific integrated circuit (ASIC). Apparently, only some (for example, the attention target estimation unit and the joint attention determination unit) of these four functional units may be integrated into the ASIC.

The attention target estimation device 10 may be configured by a general-purpose computer that causes a processor to execute programs containing instruction codes for executing the attention target estimation process and/or the joint attention determination process. In this case, the attention target estimation device 10 may be configured to include an auxiliary storage device that stores the programs coding the attention target estimation process and the joint attention determination process, a main memory device that temporarily stores the programs loaded from the auxiliary storage device, a volatile memory or a non-volatile memory that stores the 3D information, a processor that executes the programs, and a bus for connecting them. The attention target estimation device may also be configured to include a display device (unillustrated) that displays the results of the attention target estimation process or the results of the joint attention determination process.

Figure 3:
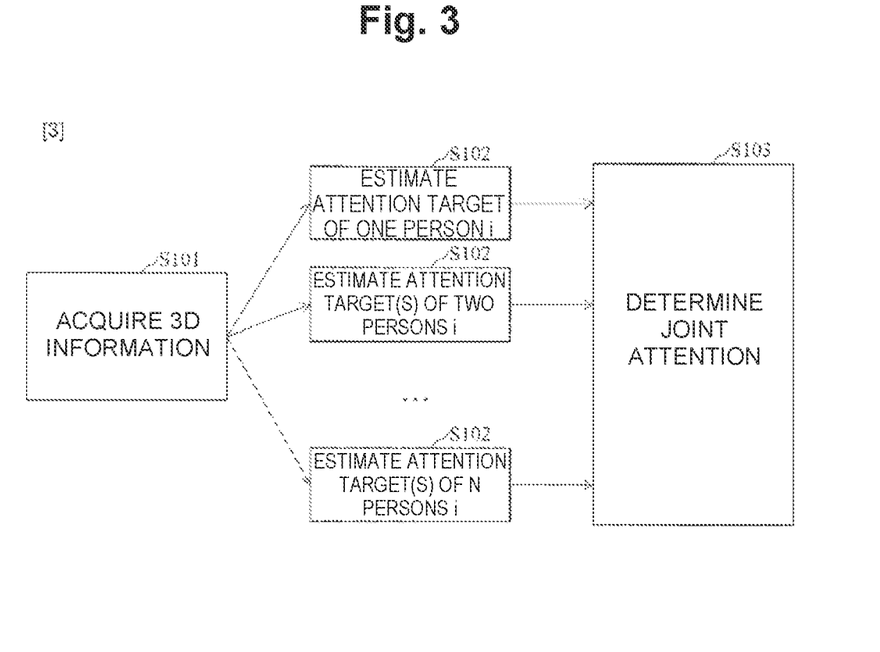
FIG. 3 is a view for describing a process flow of the attention target estimation method according to the present embodiment.

FIG. 3 is a view for describing a process flow of the attention target estimation method according to the present embodiment. The attention target estimation method according to the present embodiment is implemented in the attention target estimation device 10 illustrated in FIGS. 1 and 2, and sequentially performs the following steps:

step S101: a process of acquiring 3D information of the communication space, step S102: a process of estimating the object of the attention target for each of a plurality of persons i (i=1, 2, ..., n, n is an integer of 2 or more) communicating in the same space, and step S103: processes of determining whether or not joint attention has occurred from the objects of the attention target of the plurality of persons i.

The specific processes from step S101 to step S103 will be described below.

(1) 3D Information Acquisition Process (S101)

Before the attention target estimation process of a person, the attention target estimation device 10 acquires the 3D information of the communication space as preprocessing. In order to acquire the 3D information, for example, there can be used a technique called structure from motion (SfM) for reconstructing a 3D shape from a multi-view 2D image.

First, a plurality of 2D images are generated by capturing an image of the communication space from a plurality of different positions and angles. Feature points present in the image are extracted for each of the generated 2D images. The feature point is a pixel corresponding to, for example, a vertex, an end portion, an edge, and the like of an object in the 2D image. The brightness and the color of the feature point greatly differ from those of the background image. Thus, the feature point can be extracted, for example, by detecting the pixel whose brightness or color difference greatly changes from an adjacent pixel for each of the pixels constituting the 2D image.

Then, the 3D position (coordinates) is calculated from the positional relationship among the plurality of 2D images for each of the extracted feature points. Examples of a specific algorithm for calculating the 3D position may include one disclosed in Non-Patent Literature 3 and the like. The above process can acquire information (3D information) representing the positions of the plurality of feature points present in the communication space as a set of 3D coordinates.

Figure 4:
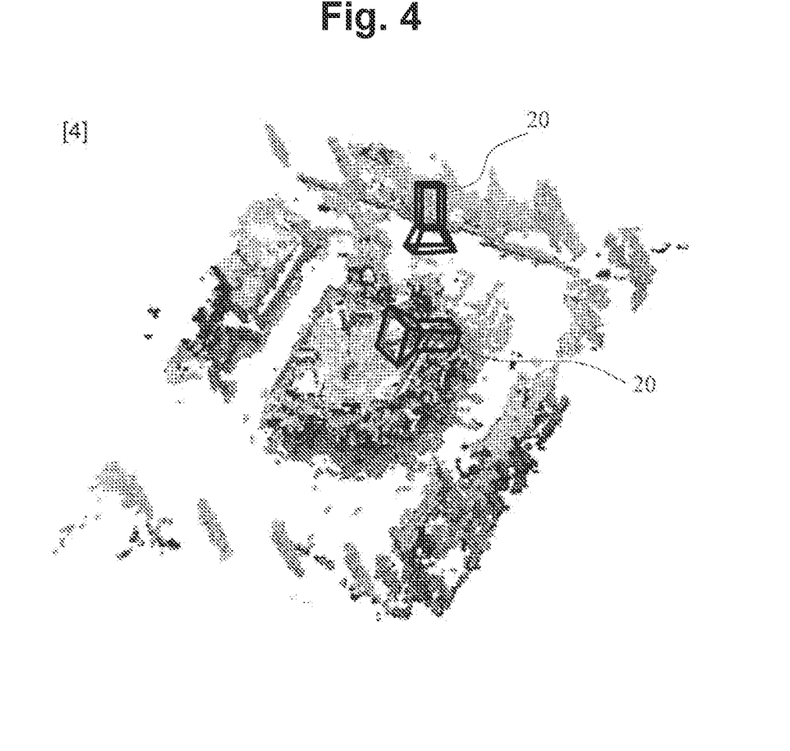
FIG. 4 is a view illustrating an example of actually acquired 3D information.

FIG. 4 is a view illustrating an example of actually acquired 3D information. In FIG. 4, each point represents the feature point extracted from the positional relationship among the plurality of 2D images. FIG. 4 also illustrates the wearable camera 20 for ease of understanding.

Figure 5:
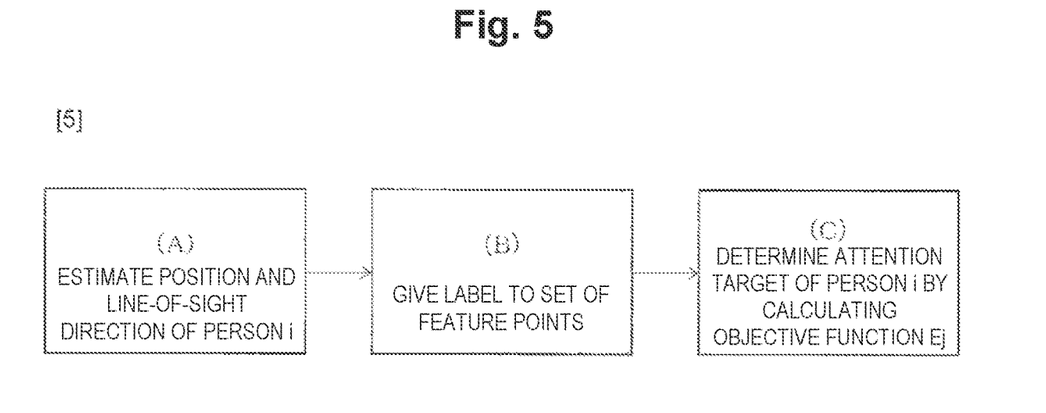
FIG. 5 is a view for describing a process flow of an attention target estimation process.

(2) Attention Target Estimation Process (S102)

The attention target estimation process of the person uses the 3D information of the communication space acquired by the above described 3D information acquisition process and the first-person point-of-view video and the line-of-sight information of the person whose attention target is to be estimated, thereby to estimate the attention target ("what" of "where") of each person. FIG. 5 is a view for describing a process flow of the attention target estimation process to be performed by each of the persons i (i=1, 2, ..., n, n is an integer of 2 or more).

(A) First, the attention target estimation device 10 estimates the presence position of the head portion of the person i present in the communication space and the line-of-sight direction (that is, the face direction). Then, the attention target estimation device 10 projects the line-of-sight information of the person i onto the 3D information of the communication space and calculates the line-of-sight position $g_i$ of the person i in the communication space.

Any method may be used to estimate the presence position and the line-of-sight direction of the person i in the communication space. For example, the estimated presence position and the line-of-sight direction match the position and the direction where the first-person point-of-view video of the person i is captured. Thus, the presence position and the line-of-sight direction in the space of the person i can be estimated by calculating the corresponding relation between the coordinates of the feature point included in the 3D information of the communication space and the pixel in the first-person point-of-view video on which it is projected.

This process is nothing other than back projection of the first-person point-of-view video of the person i onto the 3D space obtained from the 3D information of the communication space. Examples of a specific calculation method may include one disclosed in Non-Patent Literature 4 and the like.

The position that matches the line-of-sight information in the first-person point-of-view video is present on a straight line in the line-of-sight direction starting at the presence position in the communication space of the person i. The position that matches the line-of-sight information in the first-person point-of-view video has a depth on the straight line in the line-of-sight direction. Thus, any point on the straight line starting at the presence position of the head portion of the person i in the communication space and ending at the position indicated by the information of the line of sight in the first-person point-of-view video is preferably treated as the line-of-sight position $g_i$ of the person i.

(B) Then, the attention target estimation device 10 detects an object appearing in the first-person point-of-view video of the person i and maps the object area into the 3D space obtained from the 3D information of the communication space.

Examples of the object detection from the video may include the YOLO method disclosed in Non-Patent Literature 5 and the like. The object detection enables the acquisition of the area and the name of the object detected from the first-person point-of-view video. Based on the set of objects thus obtained, the label of the extracted object $O_j$ (j is a reference character for determining a plurality of objects extracted from the first-person point-of-view video) is given to the set of feature points.

Naturally, since there are a plurality of extracted objects, labels are given to all objects $O_j$. Thus, the set of feature points constituting the communication space is linked to the detected objects. Although the feature point present in the 3D information is merely information of coordinates, the set of feature points is associated with the objects in the real space. At this time, the specific names (in the example illustrated in FIG. 1, reference numerals 31 and 34 denote a "display", reference numeral 32 denotes a "desk", and reference numeral 33 denotes a "trash box", and the like) of the objects obtained by object detection may also be given to the corresponding objects.

Note that the object according to the present disclosure includes not only the object such as a display but also any target that can be identified by the first-person point-of-view video by a combination of the shape, the pattern, and the color. Examples of the objects may also include a portion of the wall or a portion of the image displayed on the display 31.

(C) Finally, the attention target estimation device 10 obtains, by calculation, the object of the attention target to which the person i might be paying attention. The basic concept of the calculation is that the object $O_j$ close to the line-of-sight position $g_i$ at which the person i is gazing is considered as the attention target.

Figure 6:
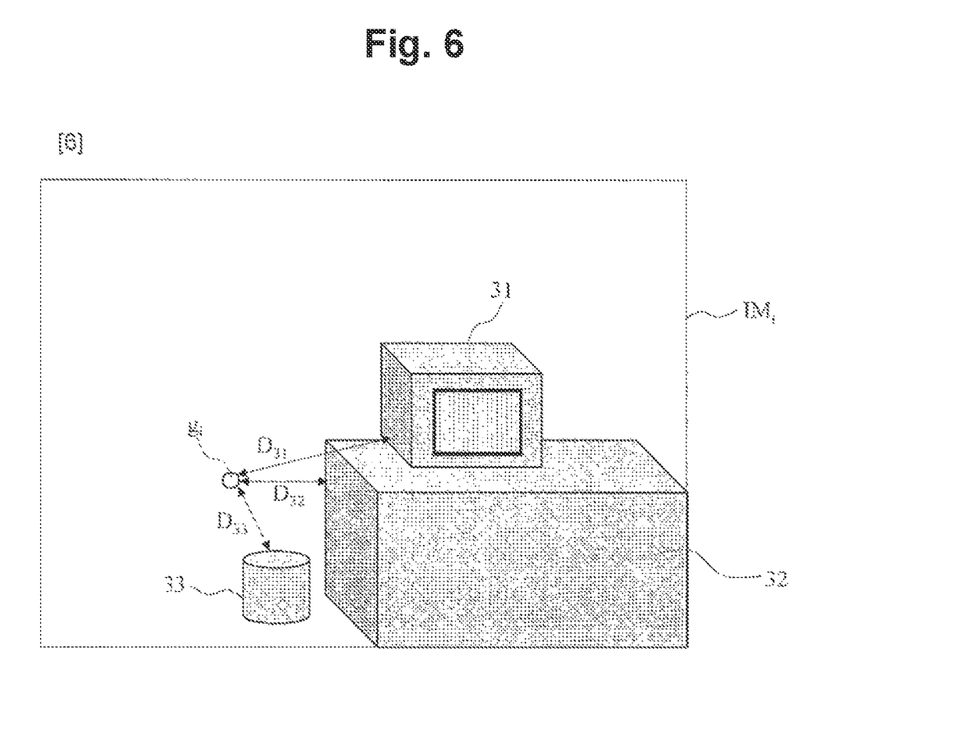
FIG. 6 is a view illustrating an example of a distance between a line-of-sight position $g_i$ of a person i and an object.

For example, as illustrated in FIG. 6, the first-person point-of-view video $IM_i$ of the person i includes the display 31, the desk 32, and the trash box 33 as the objects. Assuming that the distances between the line-of-sight position $g_i$ and the display 31, the desk 32, and the trash box 33 are $D_{31}$, $D_{32}$, and $D_{33}$ respectively and satisfy the relation of $D_{31}>D_{32}>D_{33}$, the attention target estimation device 10 determines that the trash box 33 having the shortest distance $D_{33}$ is the attention target.

When the attention target is calculated, the present disclosure may consider not only the basic concept but also the correlation with the object that has been estimated as the attention target of the person i. For example, if the distances $D_{32}$ and $D_{33}$ from the line-of-sight position $g_i$ are substantially the same as illustrated in FIG. 6, and the trash box 33 has been previously determined as the attention target within a predetermined time, the attention target estimation device 10 determines the trash box 33 as the attention target among the objects included in the first-person point-of-view video $IM_i$ of the person i.

Figure 7:
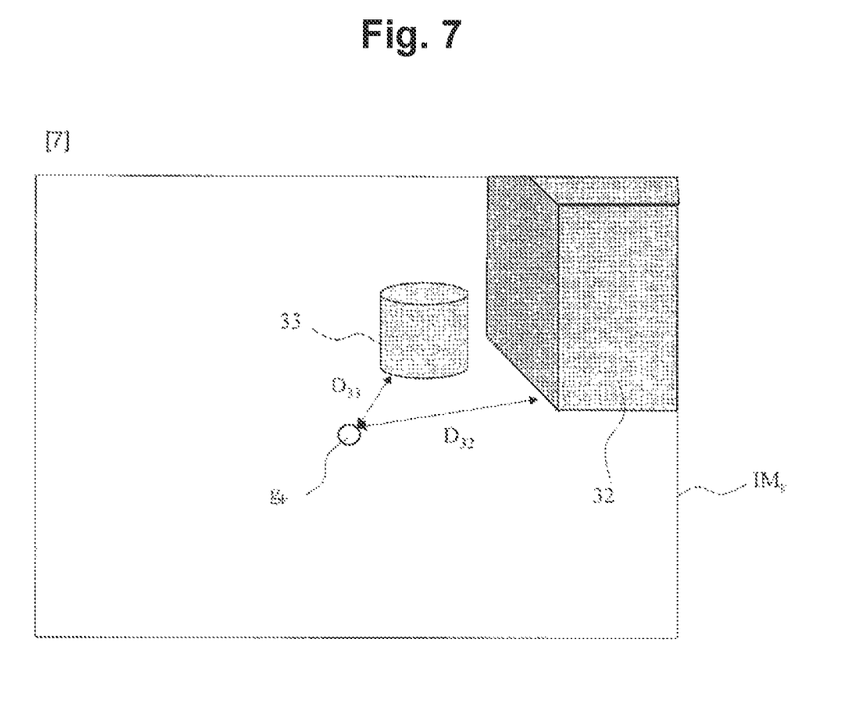
FIG. 7 is a view illustrating an example of a distance between a line-of-sight position $g_k$ of a person k and the object.

When the attention target is calculated, the present disclosure may consider not only the basic concept but also the distance from the line-of-sight position $g_k$ of the other person k present in the same communication space. For example, if the distances $D_{32}$ and $D_{33}$ from the line-of-sight position $g_i$ are substantially the same as illustrated in FIG. 6, the first-person point-of-view video $IM_k$ of the person k includes the display desk 32 and the trash box 33 as the objects as illustrated in FIG. 7, and the distances between the line-of-sight position $g_k$ and the desk 32 and the trash box 33 are $D_{32}$ and $D_{33}$ respectively and satisfy the relation of $D_{32}>D_{33}$, the attention target estimation device 10 determines that the trash box 33 is the attention target among the objects included in the first-person point-of-view video $IM_i$ of the person i.

Specifically, the following objective function $E_j$ is calculated for each of the plurality of extracted objects $O_j$, and the object having the smallest value and the 3D position thereof is determined as the attention target of the person i.

[Formula 1]

$$E_j = \frac{\|g_i - p_j\|_2^2}{|O_j|} + \lambda_1 f(O_{i,t-1}, O_j) + \lambda_2 \sum_{k \neq i} \frac{\|g_k - p_j\|_2^2}{|O_j|} \qquad (1)$$

As used herein, $g_i$ is 3D coordinates of the line-of-sight position of the person i, $g_k$ is 3D coordinates of the line-of-sight position of the person k different from the person i, $p_j$ is 3D coordinates of the center of gravity of the object $O_j$, $|O_j|$ is an area of the object $O_j$ in the first-person point-of-view video, $O_{i, t-1}$ is an object estimated as the attention target of the person i at time t−1 in a previous frame, $f(O_{i,t-1}, O_j)$ is a function of calculating the degree of correlation with the attention target estimated at time t−1 in a previous frame, and $\lambda_1$ and $\lambda_2$ are coefficients. In addition, a symbol $\|A\|$ denotes the magnitude (scalar product) of a vector A.

The first term in Formula (1) is obtained by normalizing the distance between the line-of-sight position of the person i and an evaluation target object by the size of the evaluation target object. As used herein, "$g_i$" in "$g_i$-$p_j$" is, for example, coordinates of a point closest to an evaluation target object $O_j$ on a straight line starting at the presence position of the head portion of the person i in the communication space and ending at the position indicated by the information of the line of sight in the first-person point-of-view video. Note that "$p_j$" in the first term in Formula (1) is not limited to the coordinates of the center of gravity of the object $O_j$, but may be a position closest to "$g_i$".

The second term in Formula (1) is a term that considers temporal continuity constraints and represents similarity with the attention target object in a previous frame. This term is provided based on the assumption of temporal continuity that the attention target in a previous frame is also likely to be subjected to attention in a next frame. Examples of the function f in the second term may include (i) a function of deriving the distance between the attention target object $O_{i,\,t-1}$ estimated in a previous frame and the position of the center of gravity of the attention target object $O_j$ or (ii) a function of deriving the similarity of the shape of $O_{i,\,t-1}$ and $O_j$. It should be noted that in the present disclosure, the time frame is not limited to previous one frame, as long as the time frame includes the same object in the first-person point-of-view video, and may be a predetermined number of frames or a point of time when a predetermined time has elapsed.

The third term in Formula (1) is obtained by adding the value obtained by normalizing the distance between the line-of-sight position of the person k other than the person i and the evaluation target object to every person present in the communication space. This term represents an interaction of a plurality of persons in the space and describes how much attention the persons participating in communication are paying to an object. This term is a term designed based on the assumption that the persons participating in communication tend to pay attention to the same object.

Note that the calculation of the objective function $E_j$ by Formula (1) may be performed on every object extracted, but in order to reduce the amount of calculation, the calculation may be limited to the objects present around the line-of-sight position $g_i$ of the person i. For example, in the first-person point-of-view video, the calculation may be limited to the objects arranged at a predetermined distance from the position indicated by the information of the line of sight.

(3) Joint Attention Determination Process (S103)

The attention target estimation device 10 determines whether or not joint attention has occurred from the attention target objects estimated for a plurality of persons. The attention target estimation device 10 may determine whether or not joint attention has occurred from the evaluation of similarity of "object" or from the evaluation of similarity of "place" of the attention target object. The attention target estimation device 10 may determine the presence or absence of the joint attention from the evaluation of similarity of any one of "object" and "place" or may determine the presence or absence of the joint attention by integrating the evaluation results of the similarities of both "object" and "place".

The evaluation of the similarity of "object" is determined based on the similarity between the image of the attention target object estimated for the person i and the image of the attention target object estimated for the other person k. As an index of similarity, both shape and color may be considered. Examples of the shape similarity index may include an inner product of Fisher Vectors and examples of the color index may include a color histogram similarity. When both similarity indices are calculated and the sum becomes equal to or greater than a predetermined threshold value, joint attention is considered to have occurred.

Meanwhile, the evaluation of the similarity of "place" is determined based on the Euclidean distance in the 3D space of the attention target object. When the Euclidean distance between the line-of-sight position (attention target position) of the person i and the line-of-sight position of the other person k becomes equal to or less than a predetermined threshold, joint attention is considered to have occurred.

The joint attention of "object" and the joint attention of "place" are evaluated separately. For example, let's assume a situation in which during a lecture, a teacher speaks while paying attention to a slide projected on a projector screen in front of a classroom, and a student is listening to the lecture while watching a slide of the same content on a notebook PC screen at hand. In this situation, the teacher and the student are not watching the same place but are paying attention to the same target. Thus, considering the background during the lecture, joint attention can be determined to be established. Since the joint attention can be calculated from both "object" and "place", the present disclosure can be applied to a wide range of fields.

As described above, based on the first-person point-of-view video and the line-of-sight information on a person communicating in a certain space, the attention target estimation device or the attention target estimation method according to the present disclosure can identify "what (object)" in "where (position)" of the attention target of the person, and thus can correctly estimate whether or not joint attention has occurred.

It should be noted that the present embodiment has described that the attention target estimation process (S102) identifies the object present in the communication space by detecting the object appearing in the first-person point-of-view video, but the present disclosure is not limited to this. For example, the 3D information storage unit 14 may preliminarily store object identification information such as the name of the object present in the communication space by associating the information with each corresponding feature point.

Note also that the present embodiment has described an example in which "line-of-sight information" is coordinates indicating the position at which the person is gazing in the first-person point-of-view video but the present disclosure is not limited to this. For example, any information can be used, such as information obtained by an acceleration sensor that can identify the line-of-sight direction starting at the head portion of the person i.

INDUSTRIAL APPLICABILITY

The present disclosure can be applied to the information communication industry.

REFERENCE SIGNS LIST 10 attention target estimation device
11 attention target estimation unit
12 joint attention determination unit
13 receiving unit
14 3D information storage unit

The invention claimed is:

1. An attention target estimation device comprising:
a processor; and
a storage medium having computer program instructions stored thereon, when executed by the processor, perform to:
acquire a first-person point-of-view video captured from a perspective of a person and information of a line of sight of the person when the first-person point-of-view video is captured;
identify a position of an object extracted from the first-person point-of-view video in a three-dimensional (3D) space;
determine an object close to the line of sight of the person among objects included in the first-person point-of-view video as an attention target of the person;
estimate an object of the attention target for each of a plurality of persons communicating in the same space; and determine whether joint attention has occurred based on the objects of the attention target of the plurality of persons.

2. The attention target estimation device according to claim 1, wherein the computer program instructions further perform to determine an object close to the line of sight of the person and close to the line of sight of a second person different from the person among the objects included in the first-person point-of-view video as the attention target of the person.

3. The attention target estimation device according to claim 1, wherein the computer program instructions further perform to acquire determination results of attention targets of the plurality of persons, and when objects or positions in the 3D space of the attention targets of the plurality persons are similar, determining that joint attention has occurred.

4. The attention target estimation device according to claim 1, wherein
the first-person point-of-view video is a moving image, and
an attention target previously determined as an attention target among the objects included in the first-person point-of-view video is determined as the attention target of the person.

5. The attention target estimation device according to claim 1, wherein
the information of the line of sight is a position in the first-person point-of-view video, and
the line of sight of the person is a straight line starting at a presence position of the person in a real space and ending at the position indicated by the information of the line of sight in the first-person point-of-view video.

6. An attention target estimation method performed by an attention target estimation device, the attention target estimation method comprising:
by a processor, acquiring a first-person point-of-view video captured from a perspective of a person and information of a line of sight of the person when the first-person point-of-view video is captured;
by the processor, identifying a position in a three-dimensional (3D) space of an object extracted from the first-person point-of-view video;
by the processor, determining an object close to the line of sight of the person among objects included in the first-person point-of-view video as an attention target of the person;
by the processor, estimating an object of the attention target for each of a plurality of persons communicating in the same space; and
by the processor, determining whether joint attention has occurred based on the objects of the attention target of the plurality of persons.

7. The attention target estimation method to claim 6 further comprising determining an object close to the line of sight of the person and close to the line of sight of a second person different from the person among the objects included in the first-person point-of-view video as the attention target of the person.

8. The attention target estimation method according to claim 6 further comprising acquiring determination results of attention targets of the plurality of persons, and when objects or positions in the 3D space of the attention targets of the plurality persons are similar, determining that joint attention has occurred.

9. The attention target estimation method according to claim 6, wherein
the first-person point-of-view video is a moving image, and
an attention target previously determined as an attention target among the objects included in the first-person point-of-view video is determined as the attention target of the person.

10. The attention target estimation method according to claim 6, wherein
the information of the line of sight is a position in the first-person point-of-view video, and
the line of sight of the person is a straight line starting at a presence position of the person in a real space and ending at the position indicated by the information of the line of sight in the first-person point-of-view video.

* * * * *